US010643034B2

United States Patent
Rush et al.

(10) Patent No.: US 10,643,034 B2
(45) Date of Patent: *May 5, 2020

(54) ABSTRACTIVE SENTENCE SUMMARIZATION

(71) Applicant: Facebook, Inc., Menlo Park, CA (US)

(72) Inventors: Alexander Matthew Rush, Cambridge, MA (US); Sumit Chopra, Jersey City, NJ (US); Jason Edward Weston, New York, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,910

(22) Filed: Jul. 22, 2019

(65) Prior Publication Data
US 2019/0347328 A1 Nov. 14, 2019

Related U.S. Application Data

(63) Continuation of application No. 15/694,031, filed on Sep. 1, 2017, now Pat. No. 10,402,495.

(60) Provisional application No. 62/382,769, filed on Sep. 1, 2016.

(51) Int. Cl.
| G06F 17/27 | (2006.01) |
| G06F 40/30 | (2020.01) |
| G10L 25/30 | (2013.01) |
| G10L 15/197 | (2013.01) |
| G06F 40/44 | (2020.01) |

(52) U.S. Cl.
CPC .............. *G06F 40/30* (2020.01); *G06F 40/44* (2020.01); *G10L 15/197* (2013.01); *G10L 25/30* (2013.01)

(58) Field of Classification Search
None
See application file for complete search history.

(56) References Cited

U.S. PATENT DOCUMENTS

| 8,463,591 | B1 * | 6/2013 | Chang ................... G06F 17/271 704/1 |
| 9,858,263 | B2 * | 1/2018 | Xiao ..................... G06F 16/332 |
| 10,083,157 | B2 * | 9/2018 | Strope .................... G06F 17/24 |
| 10,402,495 | B1 * | 9/2019 | Rush .................... G06F 17/2818 |
| 2017/0308790 | A1 * | 10/2017 | Nogueira dos Santos .................. G06N 3/084 |
| 2018/0329883 | A1 * | 11/2018 | Leidner ............... G06F 17/2775 |

* cited by examiner

Primary Examiner — Satwant K Singh
(74) Attorney, Agent, or Firm — Baker Botts L.L.P.

(57) ABSTRACT

In one embodiment, a sequence of input words is received. Each of the input words is encoded as an indicator vector, wherein a sequence of the indicator vectors captures features of the sequence of input words. The sequence of the indicator vectors is then mapped to a distribution of a contextual probability of a first output word in a sequence of output words. For each subsequent output word, the sequence of the indicator vectors is encoded with a context, wherein the context comprises a previously mapped contextual probability distribution of a fixed window of previous output words; and the encoded sequence of the indicator vectors and the context is mapped to the distribution of the contextual probability of the subsequent output word. Finally, a condensed summary is generated using a decoder by maximizing the contextual probability of each of the output words.

20 Claims, 8 Drawing Sheets

Input $(x_1, \ldots, x_{18})$. First sentence of article:
russian defense minister ivanov called sunday for the creation of a joint front for combating global terrorism
Output $(y_1, \ldots, y_8)$. Generated headline:
*russia calls for joint front against terrorism* ⇐ $g(terrorism, x_*for, joint, from, against)$

FIG. 2

Algorithm 1 Beam Search

Input: Parameters $\theta$, beam size $K$, input $x$
Output: Approx. $K$-best summaries $\pi[0] \leftarrow \{\epsilon\}$
$S = \mathcal{V}$ if abstractive else $\{x_i \mid \forall i\}$
for $i = 0$ to $N - 1$ do
　　▷ Generate Hypotheses
　　$\mathcal{N} \leftarrow \{[y, y_{i+1}] \mid y \in \pi[i], y_{i+1} \in S\}$ ▷ Hypothesis Recombination
　　$\mathcal{H} \leftarrow \left\{ y \in \mathcal{N} \mid \begin{array}{l} s(y, x) > s(y', x) \\ \forall y' \in \mathcal{N} \text{ s.t. } y_c = y'_c \end{array} \right\}$ ▷ Filter K-Max
　　$\pi[i+1] \leftarrow K\text{-arg}\max_{y \in \mathcal{H}} g(y_{i+1}, y_c, x) + s(y, x)$
end for
return $\pi[N]$

*FIG. 4*

ABSTRACTIVE SENTENCE SUMMARIZATION

PRIORITY

This application is a continuation under 35 U.S.C. § 120 of U.S. patent application Ser. No. 15/694,031, filed 1 Sep. 2017, which claims the benefit, under 35 U.S.C. § 119(e), of U.S. Provisional Patent Application No. 62/382,769, filed 1 Sep. 2016, which is incorporated herein by reference.

TECHNICAL FIELD

This disclosure generally relates to text analysis.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments provide a fully data-driven approach to abstractive sentence summarization. Techniques described herein may utilize a local attention-based model that generates each word of the summary conditioned on the input sentence. While the model is structurally simple, it may easily be trained end-to-end and may scale to a large amount of training data.

In particular embodiments, techniques described herein may be utilized to analyze content and augment aspects of a content-management, content-distribution, communications, social-networking, or other system incorporating the results of content analysis, including, by way of example and not limitation, summarization and/or abstraction of content, categorization and/or classification and/or characterization of content, extraction of portions of the content, extraction of metadata associated with the content, or detection of patterns in the content.

BRIEF DESCRIPTION OF THE DRAWINGS

FIG. 2 illustrates an example input sentence and the generated summary.

FIG. 4 illustrates the beam-search algorithm.

DESCRIPTION OF EXAMPLE EMBODIMENTS

Summarization is an important challenge of natural language understanding. The aim is to produce a condensed representation of an input text that captures the core meaning of the original. Most successful summarization systems utilize extractive approaches that crop out and stitch together portions of the text to produce a condensed version. In contrast, abstractive summarization attempts to produce a bottom-up summary, aspects of which may not appear as part of the original.

Figure 1:
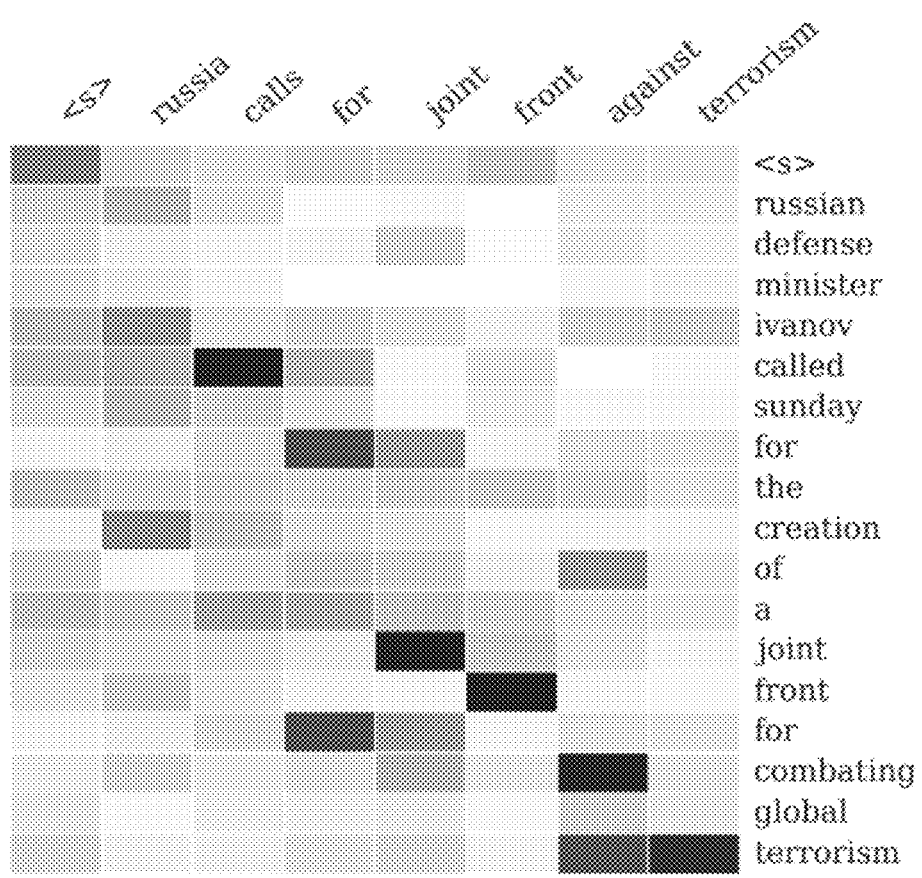
FIG. 1 illustrates an example output of particular embodiments of an Attention-Based Summarization (ABS) system.

Particular embodiments focus on the task of sentence-level summarization. Particular embodiments comprise a fully data-driven approach for generating abstractive summaries. Particular embodiments combine a neural language model with a contextual input encoder. Particular embodiments may incorporate an attention-based encoder by way of learning a latent soft alignment over the input text to help inform the summary, as shown in FIG. 1. FIG. 1 illustrates example output of particular embodiments of an Attention-Based Summarization (ABS) system. The heat map represents a soft alignment between the input (right) and the generated summary (top). The columns represent the distribution over the input after generating each word. Both the encoder and the generation model may be trained jointly on the sentence summarization task. In particular embodiments, the model may also incorporate a beam-search decoder as well as additional features to model extractive elements.

The ABS approach to summarization may incorporate less linguistic structure than comparable abstractive summarization approaches, but may easily scale to train on a large amount of data. Particular embodiments may be trained directly on any document-summary pair. An example of generation is given in FIG. 2, which illustrates an example input sentence and the generated summary. The score of generating $y_{i+1}$ (terrorism) is based on the context $y_c$ (for . . . against) as well as the input $x_1 \ldots x_{18}$. Note that the summary generated is abstractive which makes it possible to perform editing operations, e.g., generalize (russian defense minister to russia) and paraphrase (for combating to against), in addition to compressing (dropping the creation of). Particular embodiments may outperform a machine translation system trained on a large-scale dataset and yield a large improvement over other systems.

To define the sentence summarization task: given an input sentence, the goal is to produce a condensed summary. Let the input consist of a sequence of M words $x_1, \ldots,$ coming from a fixed vocabulary $\mathcal{V}$ of size $|\mathcal{V}|=V$. Particular embodiments may represent each word as an indicator vector $x_i \in (0, 1)^V$ for $i \in \{1, \ldots, M\}$, sentences as a sequence of indicators, and X as the set of possible inputs. Furthermore define the notation $x_{[i, j, k]}$ to indicate the sub-sequence of elements i, j, k.

A summarizer takes x as input and outputs a shortened sentence y of length N<M. Particular embodiments may assume that the words in the summary also come from the same vocabulary $\mathcal{V}$ and that the output is a sequence of $y_1, \ldots, y_N$. Note that in contrast to related tasks, like machine translation, particular embodiments may assume that the output length N is fixed, and that the system knows the length of the summary before generation. In particular embodiments, the number of bytes of the output may be capped.

Next consider the problem of generating summaries. Define the set $Y \subset (\{0, 1\}^V, \ldots, \{0, 1\}^V)$ as all possible sentences of length N, e.g., for all i and $y \in Y$, $y_i$ is an indicator. In particular embodiments, a system is abstractive if it tries to find the optimal sequence from this set Y, $$\underset{y \in \mathcal{Y}}{\operatorname{argmax}} \; s(x, y), \quad (1)$$

under a scoring function s: $X=Y \to \mathbb{R}$. Contrast this to a fully extractive sentence summary which transfers words from the input:

$$\underset{m \in \{1, \ldots M\}^N}{\operatorname{argmax}} \; s(x, x_{[m_1, \ldots, m_N]}), \quad (2)$$

or to the related problem of sentence compression that concentrates on deleting words from the input:

$$\underset{m \in \{1, \ldots M\}^N, \; m_{i-1} < m_i}{\operatorname{argmax}} \; s(x, x_{[m_1, \ldots, m_N]}). \quad (3)$$

While abstractive summarization may pose a more difficult generation challenge, the lack of hard constraints gives the system more freedom in generation and allows it to fit with a wider range of training data.

Particular embodiments focus on factored scoring functions, s, that take into account a fixed window of previous words:

$$s(x, y) \approx \sum_{i=0}^{N-1} g(y_{i+1}, x, y_c), \quad (4)$$

with a definition of $y_c \triangleq y_{[i-C+1, \ldots, i]}$ for a window of size C.

In particular consider the conditional log-probability of a summary given the input, $s(x, y) = \log p(y|x; \theta)$. This may be written as:

$$\log p(y \mid x; \theta) \approx \sum_{i=0}^{N-1} \log p(y_{i+1} \mid x, y_c; \theta),$$

incorporating a Markov assumption on the length of the context as size C and assume for i<1, $y_i$ is a special start symbol <S>.

With this scoring function in mind, our main focus will be on modelling the local conditional distribution: $p(y_{i+1}|x, y_c; \theta)$. The next section defines a parameterization for this distribution, Section 4 discusses the question of generation for factored models, and Section 5 introduces a modified factored scoring function.

Model: the distribution of interest, $p(y_{i+1}|x, y_c; \theta)$, is a conditional language model based on the input sentence x. Other techniques on summarization and compression have used a noisy-channel approach to split and independently estimate a language model and a conditional summarization model: e.g., $$\underset{y}{\operatorname{argmax}} \log p(y \mid x) = \underset{y}{\operatorname{argmax}} \log p(y) p(x \mid y)$$

where p(y) and p(x|y) are estimated separately. Particular embodiments may incorporate neural machine translation and directly parameterize the original distribution as a neural network. The network contains both a neural probabilistic language model and an encoder which acts as a conditional summarization model.

Neural Language Models: the core of our parameterization is a language model for estimating the contextual probability of the next word. The language model is adapted from a standard feed-forward neural network language model (NNLM). In particular embodiments, the full model may be:

$$p(y_{i+1} \mid y_c, x; \theta) \propto \exp(Vh + W enc(x, y_c)),$$

$$\tilde{y}_c = [Ey_{i-C+1}, \ldots, Ey_i],$$

$$h = \tanh(U \tilde{y}_c).$$

Figure 3A:
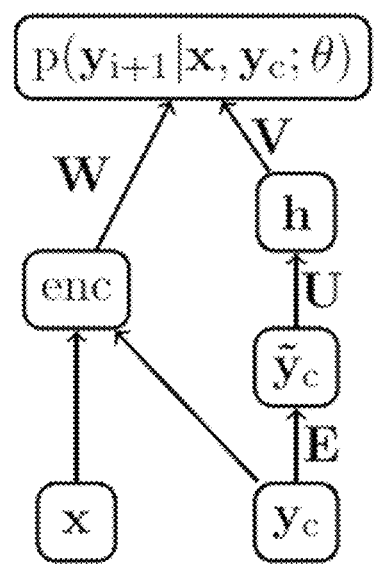
FIG. 3A illustrates an example schematic representation for the NNLM decoder with additional encoder element.

The parameters are $\theta=(E, U, V, W)$ where $E \in \mathbb{R}^{D \times V}$ is a word embedding matrix, $U \in \mathbb{R}^{(CD) \times H}$, $V \in \mathbb{R}^{V \times H}$, $W \in \mathbb{R}^{V \times H}$ are weight matrices (in particular embodiments, each of the weight matrices U, V, W may also have a corresponding bias term—for readability, such terms may be omitted in this document), D is the size of the word embeddings, and h is a hidden layer of size H. The black-box function enc is a contextual encoder term that returns a vector of size H representing the input and current context. FIG. 3A illustrates an example schematic representation for the NNLM decoder with additional encoder element.

Encoders: note that without the encoder term this represents a standard language model. By incorporating in enc and training the two elements jointly, particular embodiments may be able to incorporate the input text into generation.

Bag-of-Words Encoder: one model may use the bag-of-words of the input sentence embedded down to size H, while ignoring properties of the original order or relationships between neighboring words:

$$enc_1(x, y_c) = p^\top \tilde{x},$$

$$p = [1/M, \ldots, 1/M],$$

$$\tilde{x} = [Fx_1, \ldots, Fx_M].$$

In this model, the input-side embedding matrix $F \in \mathbb{R}^{H \times V}$ is the only new parameter of the encoder and $p \in [0, 1]^M$ is a uniform distribution over the input words.

For summarization, this model may be able to capture the relative importance of words to distinguish content words from stop words or embellishments. The model may also learn to combine words; although particular embodiments may be limited in representing contiguous phrases.

Convolutional Encoder: to address some of the modelling issues with bag-of-words, particular embodiments may use a deep convolutional encoder for the input sentence. This architecture may allow local interactions between words while also not requiring the context $y_c$ while encoding the input.

We utilize a standard time-delay neural network (TDNN) architecture, alternating between temporal convolution layers and max pooling layers.

$$\forall j, enc_2(x, y_c)_j = \max_i \bar{x}^L_{i,j}, \quad (5)$$

$$\forall i, l \in \{1, \ldots L\}, \bar{x}^l_j = \tanh(\max\{\bar{x}^l_{2i-1}, \bar{x}^l_{2i}\}), \quad (6)$$

$$\forall i, l \in \{1, \ldots L\}, \bar{x}^l_i = Q^l \tilde{x}^{l-1}_{[i-Q, \ldots, i+Q]}, \quad (7)$$

$$\tilde{x}^0 = [Fx_1, \ldots, Fx_M]. \quad (8)$$

Where F is a word embedding matrix and $Q^{L \times H \times 2Q+1}$ consists of a set of filters for each layer $\{1, \ldots L\}$. Eq. 7 is a temporal (1D) convolution layer, Eq. 6 consists of a 2-element temporal max pooling layer and a pointwise non-linearity, and final output Eq. 5 is a max over time. At each layer $\tilde{x}$ is one half the size of $\bar{x}$. For simplicity, particular embodiments may assume that the convolution is padded at the boundaries, and that M is greater than $2^L$ so that the dimensions are well-defined.

Attention-Based Encoder: while a convolutional encoder-based model may have richer capacity than a bag-of-words-based model, particular embodiments may still need to produce a single representation for the entire input sentence. Particular embodiments may utilize an attention-based contextual encoder that constructs a representation based on the generation context, thus utilizing a model similar to bag-of-words:

$$enc_3(x, y_c) = p^\top \bar{x},$$

$$p \propto \exp(\tilde{x} P \tilde{y}'_c),$$

$$\tilde{x} = [Fx_1, \ldots, Fx_M],$$

$$\tilde{y}'_c = [Gy_{i-C+1}, \ldots, Gy_i],$$

$$\forall i \bar{x}_i = \sum_{q=i-Q}^{i+Q} \tilde{x}_i / Q.$$

Figure 3B:
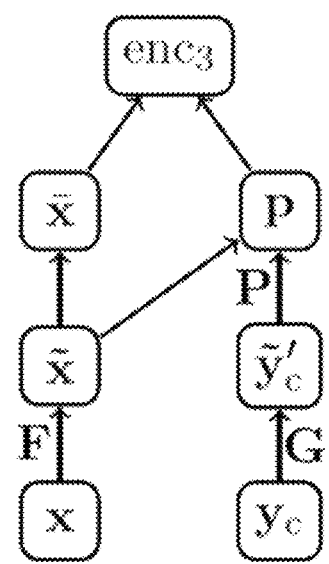
FIG. 3B illustrates an example schematic representation for an attention-based contextual encoder that constructs a representation based on the generation context.

In such a model, $G \in \mathbb{R}^{D \times V}$ is an embedding of the context, $P \in \mathbb{R}^{H \times (CD)}$ is a new weight matrix parameter mapping between the context embedding and input embedding, and Q is a smoothing window. The full model is shown in FIG. 3B.

Informally we can think of this model as simply replacing the uniform distribution in bag-of-words with a learned soft alignment, P, between the input and the summary. FIG. 1 shows an example of this distribution p as a summary is generated. The soft alignment is then used to weight the smoothed version of the input $\bar{x}$ when constructing the representation. For instance if the current context aligns well with position i then the words $x_{i-Q}, \ldots, x_{i+Q}$ are highly weighted by the encoder. Together with the NNLM, this model can be seen as a stripped-down version of the attention-based neural machine translation model. Particular embodiments may use an NNLM instead of a target-side long short term memory (LSTM), source-side windowed averaging instead of a source-side bi-directional recurrent neural network (RNN), and a weighted dot-product for alignment instead of an alignment multi-layer perceptron (MLP).

Training: the lack of generation constraints makes it possible to train the model on arbitrary input-output pairs. Once the local conditional model has been defined, $p(y_{i+1}|x, y_c; \theta)$, we can estimate the parameters to minimize the negative log-likelihood of a set of summaries. Define this training set as consisting of J input-summary pairs $(x^{(1)}, y^{(1)}), \ldots, (x^{(J)}, y^{(J)})$. The negative log-likelihood conveniently factors into a term for each token in the summary:

$$NLL(\theta) = -\sum_{j=1}^{J} \log p(y^{(j)} | x^{(j)}; \theta),$$

$$= -\sum_{j=1}^{J} \sum_{i=1}^{N-1} \log p(y^{(j)}_{i+1} | x^{(j)}, y_c; \theta).$$

This may be dependent on using the gold standard contexts $y_c$. An alternative is to use the predicted context within a structured or reinforcement-learning style objective.

Further discussing the task of generating summaries, as shown in Eq. 4, the goal is to find, $$y^* = \underset{y \in \mathcal{Y}}{\operatorname{argmax}} \sum_{i=0}^{N-1} g(y_{i+1}, x, y_c).$$

Unlike phrase-based machine translation where inference is NP-hard, it actually is tractable in theory to compute y*. Since there is no explicit hard alignment constraint, Viterbi decoding can be applied and requires $O(NV^C)$ time to find an exact solution. In practice though V is large enough to make this difficult. An alternative approach is to approximate the arg max with a strictly greedy or deterministic decoder.

One compromise between exact and greedy decoding is to use a beam-search decoder which maintains the full vocabulary $\mathcal{V}$ while limiting itself to K potential hypotheses at each position of the summary. FIG. 4 illustrates the beam-search algorithm, modified for the feed-forward model.

This beam search algorithm may be much simpler than beam search for phrase-based MT. Because there is no explicit constraint that each source word be used exactly once, there is no need to maintain a bit set and we can simply move from left-to-right generating words. The beam search algorithm requires O(KNV) time. From a computational perspective though, each round of beam search is dominated by computing $p(y_i|x, y_c)$ for each of the K hypotheses. These can be computed as a mini-batch, which in practice greatly reduces the factor of K.

Particular embodiments may be able to find extractive word matches when necessary, for example transferring unseen proper noun phrases from the input. Particular embodiments may adjust the abstractive/extractive nature of the system by modifying the scoring function to directly estimate the probability of a summary using a log-linear model, as may be done with machine translation:

$$p(y \mid x; \theta, \alpha) \propto \exp\left(\alpha^\top \sum_{i=0}^{N-1} f(y_{i+1}, x, y_c)\right).$$

In the above-described equation, $\alpha \in \mathbb{R}^5$ is a weight vector and $f$ is a feature function. Finding the best summary under this distribution corresponds to maximizing a factored scoring function s, $$s(y, x) = \sum_{i=0}^{N-1} \alpha^\top f(y_{i+1}, x, y_c).$$

where $g(y_{i+1}, x, y_c) \triangleq \alpha^T f(y_{i+1}, x, y_c)$ to satisfy Eq. 4. The function $f$ is defined to combine the local conditional probability with some additional indicator features:

$$f(y_{i+1}, x, y_c) = [\log p(y_{i+1} \mid x, y_c; \theta),$$

$$\mathbb{1}\{\exists j \cdot y_{i+1} = x_j\},$$

$$\mathbb{1}\{\exists j \cdot y_{i+1-k} = x_{j-k} \forall k \in \{0, 1\}\},$$

$$\mathbb{1}\{\exists j \cdot y_{i+1-k} = x_{j-k} \forall k \in \{0, 1, 2\}\},$$

$$\mathbb{1}\{\exists k > j \cdot y_i = x_k, y_{i+1} = x_j\}].$$

These features correspond to indicators of unigram, bigram, and trigram match with the input as well as reordering of input words. Note that setting $\alpha=(1, 0, \ldots, 0)$ gives a model identical to standard ABS.

After training the main neural model, particular embodiments may fix $\theta$ and tune the $\alpha$ parameters. Particular embodiments may follow the statistical machine translation setup and use minimum-error rate training (MERT) to tune for the summarization metric on tuning data. This tuning step is also identical to the one used for the phrase-based machine translation baseline.

Particular embodiments may: (1) use a neural summarization model as opposed to a count-based noisy-channel model, (2) train the model on much larger scale (e.g., 25,000 compared to 4,000,000 articles), (3) and allow fully abstractive decoding. Some embodiments may incorporate a recurrent neural network language model (RNN-LM).

For example, when generating headlines for a database of news articles, particular embodiments may pair the headline of each article with its first sentence to create an input summary pairs for a training data set. While the model could in theory be trained on any pair, the database may contain many spurious headline-article pairs. Particular embodiments may prune training data based on the following heuristic filters: (1) Are there no non-stop-words in common? (2) Does the title contain a byline or other extraneous editing marks? (3) Does the title have a question mark or colon?

After applying these filters, the training set may be reduced to a smaller number of title-article pairs. Particular embodiments may then apply a pre-processing step using deterministic tokenization, lower-casing, replacing all digit characters with #, and replacing word types seen less than five times with "UNK" (representing unknown terms). Particular embodiments may also remove all articles from particular time periods.

For training purposes, particular embodiments may use mini-batch stochastic gradient descent to minimize negative log-likelihood. Particular embodiments may use a learning rate of 0.05, and split the learning rate by half if validation log-likelihood does not improve for an epoch. In particular embodiments, training is performed with shuffled mini-batches of size 64. The mini-batches may be grouped by input length. After each epoch, particular embodiments may renormalize the embedding tables.

Based on the validation set, particular embodiments may set hyper-parameters as D=200, H=400, C=5, L=3, and Q=2. In one example, processing 1000 mini-batches with D=200, H=400 requires 160 seconds. Best validation accuracy may be reached after 15 epochs through the data, which requires around four days of training.

Figure 5:
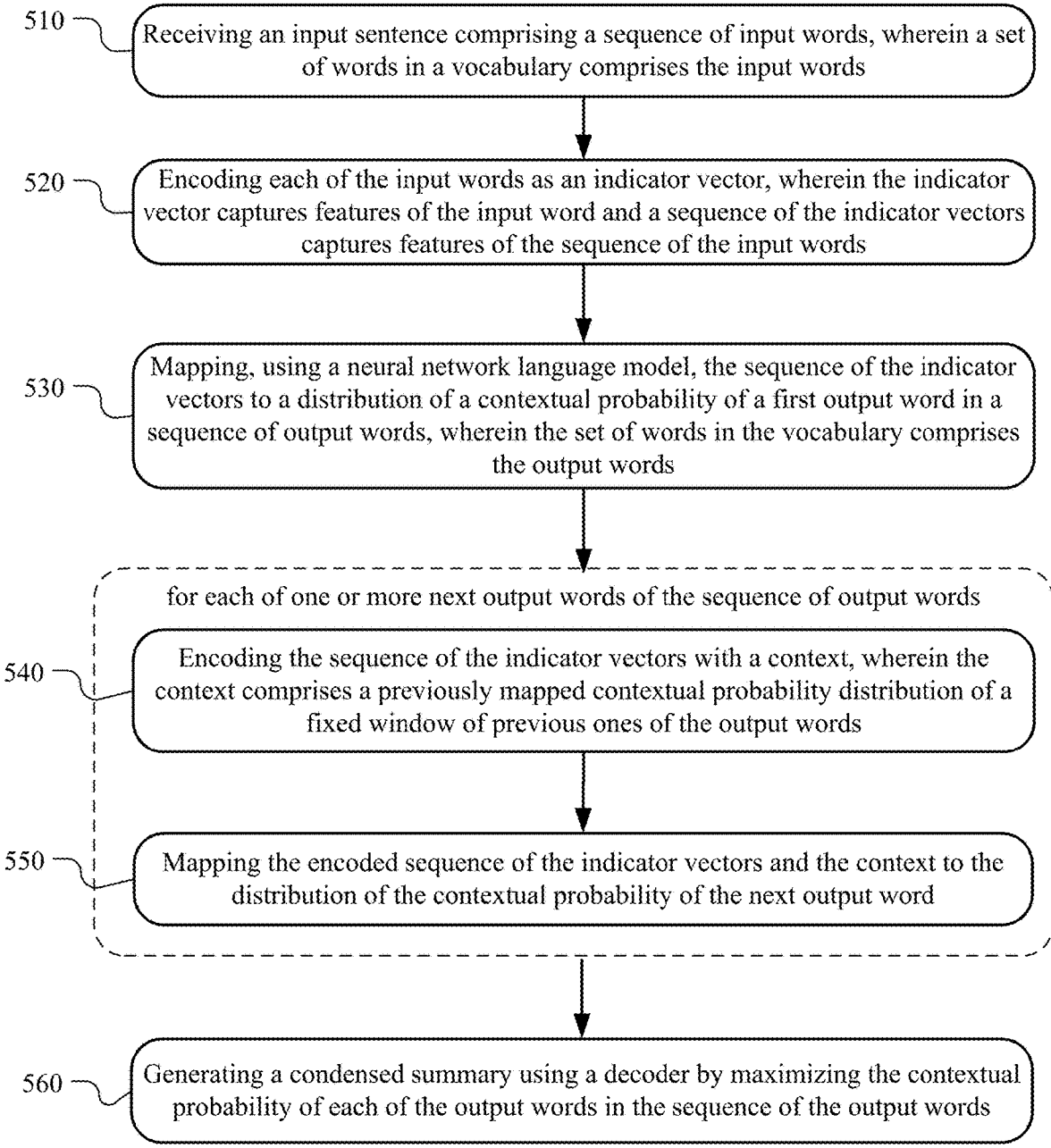
FIG. 5 illustrates an example method for summarizing a sentence.

FIG. 5 illustrates an example method 500 for summarizing a sentence. In step 510, an input sentence comprising a sequence of input words is received. The input words may be included in a vocabulary set of words. In step 520, each of the input words is encoded as an indicator vector, wherein a sequence of the indicator vectors captures features of the sequence of input words. In step 530, the sequence of the indicator vectors is then mapped to a distribution of a contextual probability of a first output word in a sequence of output words. . The output words may also be included in the vocabulary set of words. Then, for each subsequent output word, in step 540, the sequence of the indicator vectors is encoded with a context, wherein the context comprises a previously mapped contextual probability distribution of a fixed window of previous output words; and in step 550, the encoded sequence of the indicator vectors and the context is mapped to the distribution of the contextual probability of the subsequent output word. Finally, in step 560, a condensed summary is generated using a decoder by maximizing the contextual probability of each of the output words.

Figure 6:
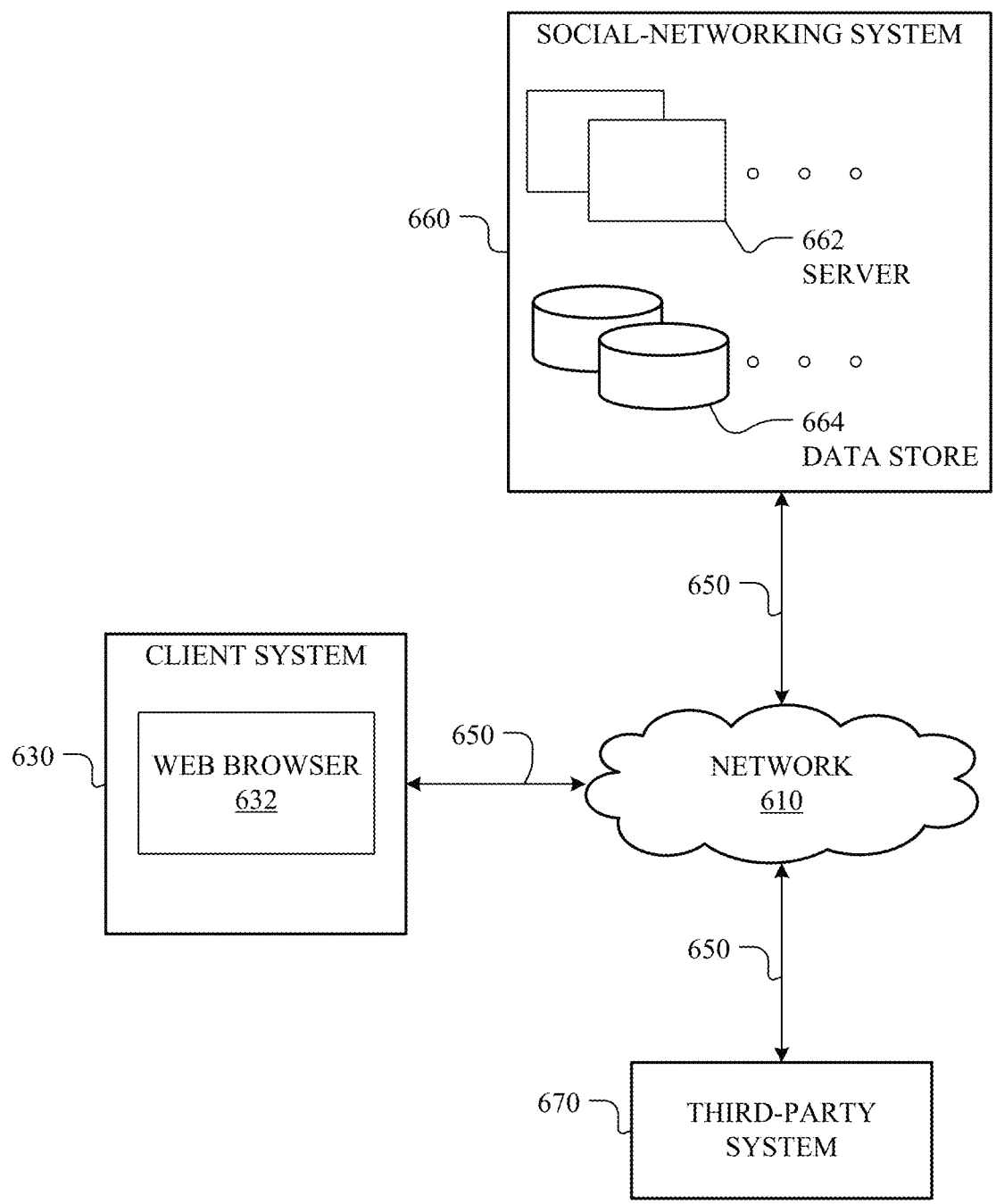
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Figure 7:
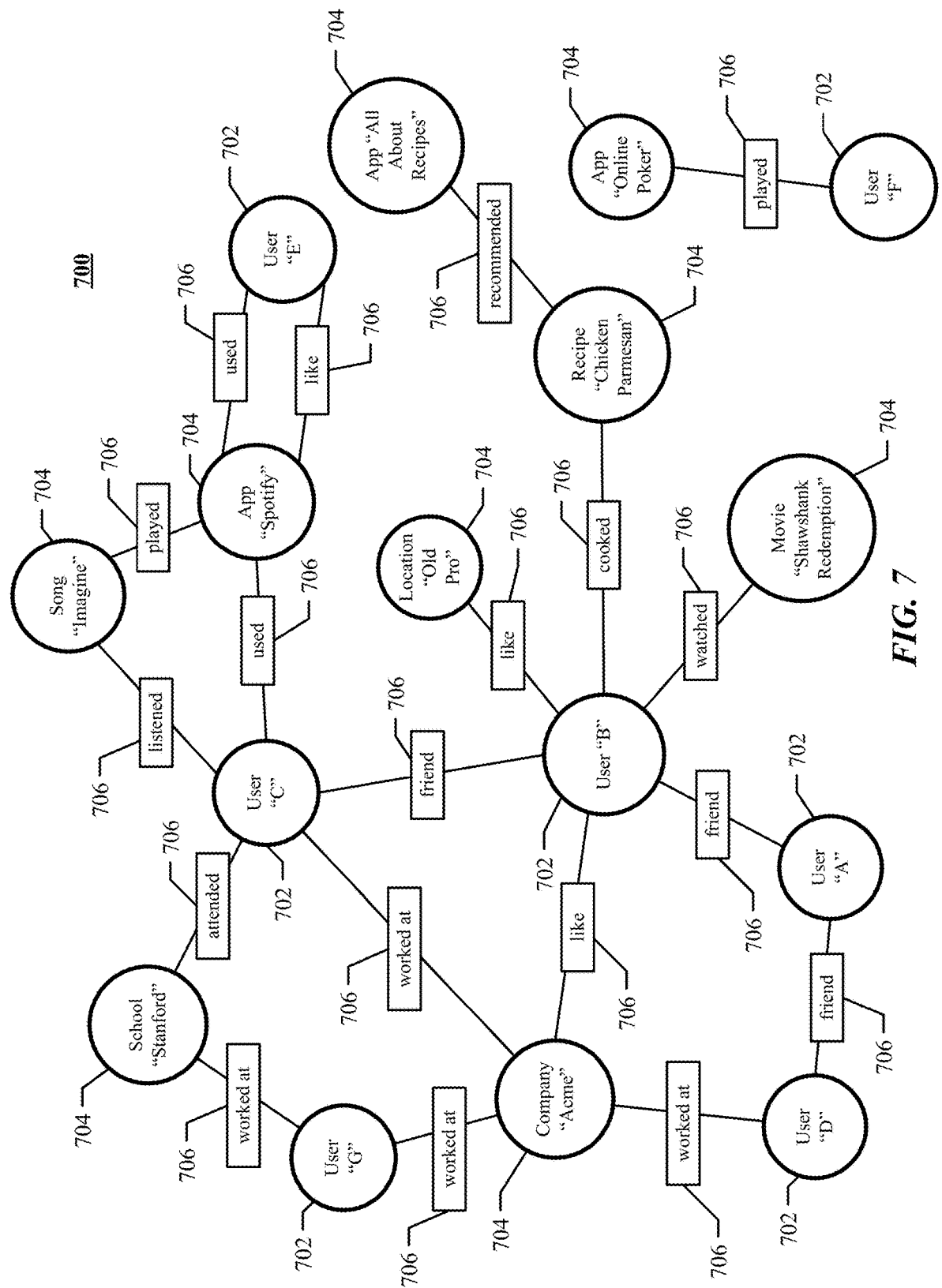
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application (SPOTIFY) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "SPOTIFY").

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 660). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 660. In addition or as an alternative, the social action may be promoted outside or off of social-networking system 660, where appropriate. In particular embodiments, a page may be an on-line presence (such as a webpage or website within or outside of social-networking system 660) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 660. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream"

and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 660) or RSVP (e.g., through social-networking system 660) to an event associated with the advertisement. In addition or as an alternative, an advertisement may include social-networking-system content directed to the user. For example, an advertisement may display information about a friend of the user within social-networking system 660 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 660 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 660.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 660 to identify those users. In addition or as an alternative, social-networking system 660 may use user-profile information in social-networking system 660 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 660, off or outside of social-networking system 660, or on mobile computing devices of users. When on or within social-networking system 660, such targeting may be directed to users' news feeds, search results, e-mail or other in-boxes, or notifications channels or may appear in particular area of web pages of social-networking system 660, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 660, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 660 or explicit connections of a user to a node, object, entity, brand, or page on social-networking system 660. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. Nos. 12/858,718; 13/051,286, entitled "Sending Notifications to Users Based on Users' Notification Tolerance Levels" and filed 18 Mar.2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 660 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 670 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 660 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 660 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 660 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 660 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 660 may calculate a coefficient based on a user's actions. Social-networking system 660 may monitor such actions on the online social network, on a third-party system 670, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 660 may calculate a coefficient based on the user's actions with particular types of content. The content may be associated with the online social network, a third-party system 670, or another suitable system. The content may include users, profile pages, posts, news stories, headlines, instant messages, chat room conversations, emails, advertisements, pictures, video, music, other suitable objects, or any combination thereof. Social-networking system 660 may analyze a user's actions to determine whether one or more of the actions indicate an affinity for subject matter, content, other users, and so forth. As an example and not by way of limitation, if a user frequently posts content related to "coffee" or variants thereof, social-networking system 660 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 660 may calculate a coefficient based on the type of relationship between particular objects. Referencing the social graph 700, social-networking system 660 may analyze the number and/or type of edges 706 connecting particular user nodes 702 and concept nodes 704 when calculating a coefficient. As an example and not by way of limitation, user nodes 702 that are connected by a spouse-type edge (representing that the two users are married) may be assigned a higher coefficient than a user nodes 702 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 660 may determine that the user has a higher coefficient with respect to the first photo than the second photo because having a tagged-in-type relationship with content may be assigned a higher weight and/or rating than having a like-type relationship with content. In particular embodiments, social-networking system 660 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 660 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 700. As an example and not by way of limitation, social-graph entities that are closer in the social graph 700 (e.g., fewer degrees of separation) may have a higher coefficient than entities that are further apart in the social graph 700.

In particular embodiments, social-networking system 660 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 630 of the user). A first user may be more interested in other users or concepts that are closer to the first user. As an example and not by way of limitation, if a user is one mile from an airport and two miles from a gas station, social-networking system 660 may determine that the user has a higher coefficient for the airport than the gas station based on the proximity of the airport to the user.

In particular embodiments, social-networking system 660 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 660 may provide information that is relevant to user's interests and current circumstances, increasing the likelihood that they will find such information of interest. In particular embodiments, social-networking system 660 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 660 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 660 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 670 (e.g., via an API or other communication channel), or from another suitable system. In response to the request, social-networking system 660 may calculate the coefficient (or access the coefficient information if it has previously been calculated and stored). In particular embodiments, social-networking system 660 may measure an affinity with respect to a particular process. Different processes (both internal and external to the online social network) may request a coefficient for a particular object or set of objects. Social-networking system 660 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug.2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 760 or shared with other systems (e.g., third-party system 770). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 762 may be authorization/privacy servers for enforcing privacy settings. In response to a request from a user (or other entity) for a particular object stored in a data store 764, social-networking system 760 may send a request to the data store 764 for the object. The request may identify the user associated with the request and may only be sent to the user (or a client system 730 of the user) if the authorization server determines that the user is authorized to access the object based on the privacy settings associated with the object. If the requesting user is not authorized to access the object, the authorization server may prevent the requested object from being retrieved from the data store 764, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 8:
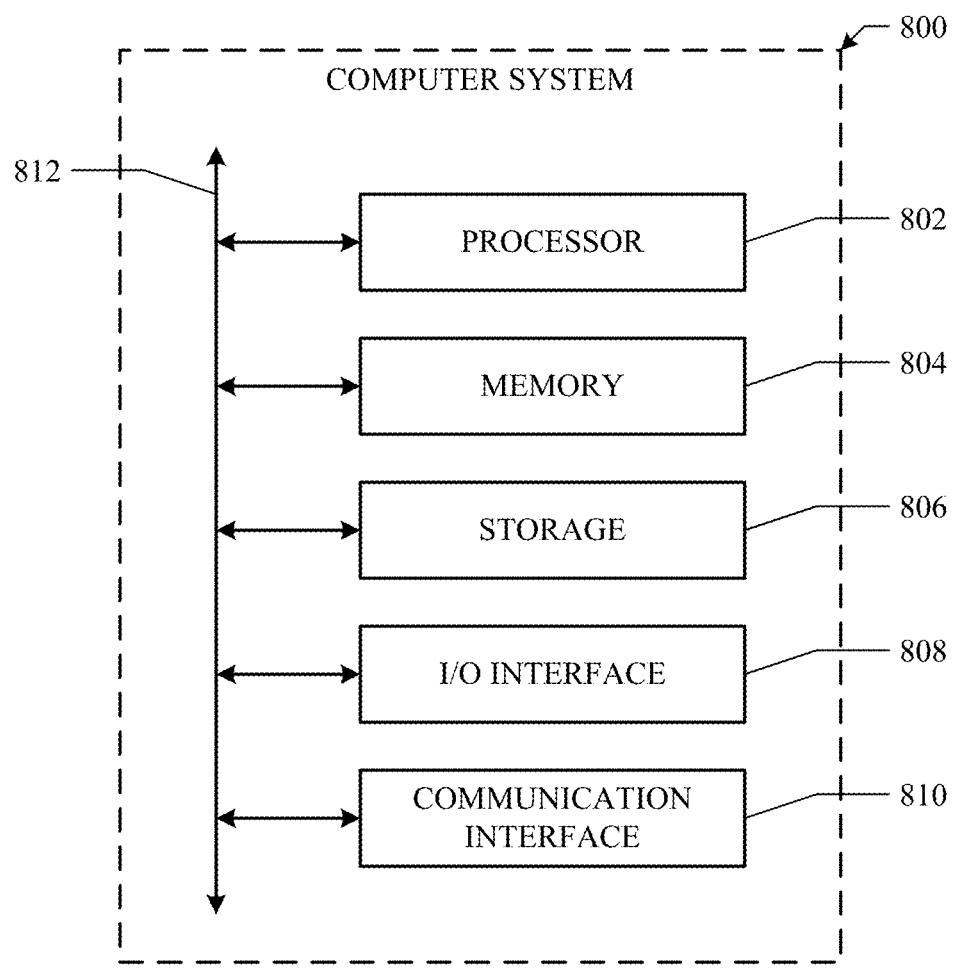
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache.

Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computer server devices:
   receiving an input sentence comprising a sequence of input words, wherein a set of words in a vocabulary comprises the input words;
   determining, using a neural network language model, a contextual probability of a first output word in a sequence of output words, wherein the set of words in the vocabulary comprises the output words;
   for each of one or more next output words of the sequence of output words:
   determining a context of a sequence of the input words, wherein the context comprises a previously mapped contextual probability distribution of a fixed window of previous ones of the output words; and
   determining the contextual probability of the next output word; and
   generating a condensed summary using a decoder by maximizing the contextual probability of each of the output words in the sequence of the output words.

2. The method of claim 1, further comprising:
   encoding each of the input words as an indicator vector, wherein the indicator vector captures features of the input word and a sequence of the indicator vectors captures features of the sequence of the input words, wherein the determining the context of the sequence of the input words comprises encoding the sequence of the indicator vectors with the context.

3. The method of claim 2, wherein determining the contextual probability of the first output word comprises mapping the sequence of the indicator vectors to a distribution of the contextual probability of the next output word.

4. The method of claim 3, wherein determining the contextual probability of the next output word comprises mapping the encoded sequence of the indicator vectors and the context to the distribution of the contextual probability of the next output word.

5. The method of claim 2, wherein the encoding comprises using an attention-based encoder which is used to find a latent soft alignment between the indicator vectors and the context, and wherein the latent soft alignment points to a position in the sequence of the indicator vectors where a block of highly relevant information for generating the summary is concentrated.

6. The method of claim 1, wherein a number of the output words in the sequence of the output words is pre-determined.

7. The method of claim 1, wherein the decoder is a Viterbi decoder that finds an exact solution by searching through an entire distribution of the contextual probability.

8. The method of claim 1, wherein the decoder is a beam search decoder that finds an approximate solution by searching through a limited distribution of the contextual probability.

9. The method of claim 1, further comprising modifying a scoring function to find extractive word matches from the input sentences by directly estimating the contextual probability using a log-linear model.

10. One or more computer-readable non-transitory storage media embodying software that is operable when executed to:
    receive an input sentence comprising a sequence of input words, wherein a set of words in a vocabulary comprises the input words;
    determine, using a neural network language model, a contextual probability of a first output word in a sequence of output words, wherein the set of words in the vocabulary comprises the output words;
    for each of one or more next output words of the sequence of output words:
    determine a context of a sequence of the input words, wherein the context comprises a previously mapped contextual probability distribution of a fixed window of previous ones of the output words; and
    determine the contextual probability of the next output word; and
    generate a condensed summary using a decoder by maximizing the contextual probability of each of the output words in the sequence of the output words.

11. The non-transitory storage media of claim 10, wherein the software is further operable when executed to:
    encoding each of the input words as an indicator vector, wherein the indicator vector captures features of the input word and a sequence of the indicator vectors captures features of the sequence of the input words, wherein the determining the context of the sequence of the input words comprises encoding the sequence of the indicator vectors with the context.

12. The non-transitory storage media of claim 11, wherein the software operable to determine the contextual probability of the first output word comprises software operable to map the sequence of the indicator vectors to a distribution of the contextual probability of the next output word.

13. The non-transitory storage media of claim 12, wherein the software operable to determine the contextual probability of the next output word comprises the software operable to map the encoded sequence of the indicator vectors and the context to the distribution of the contextual probability of the next output word.

14. The non-transitory storage media of claim 11, wherein the software operable to encode uses an attention-based encoder to find a latent soft alignment between the indicator vectors and the context, and wherein the latent soft alignment points to a position in the sequence of the indicator vectors where a block of highly relevant information for generating the summary is concentrated.

15. The non-transitory storage media of claim 10, wherein a number of the output words in the sequence of the output words is pre-determined.

16. The non-transitory storage media of claim 10, wherein the decoder is a Viterbi decoder that finds an exact solution by searching through an entire distribution of the contextual probability.

17. The non-transitory storage media of claim 10, wherein the decoder is a beam search decoder that finds an approximate solution by searching through a limited distribution of the contextual probability.

18. The non-transitory storage media of claim 10, further comprising software operable to modify a scoring function to find extractive word matches from the input sentences by directly estimating the contextual probability using a log-linear model.

19. A system comprising: one or more processors; and a memory coupled to the processors comprising instructions executable by the processors, the processors being operable when executing the instructions to:

receive an input sentence comprising a sequence of input words, wherein a set of words in a vocabulary comprises the input words;

determine, using a neural network language model, a contextual probability of a first output word in a sequence of output words, wherein the set of words in the vocabulary comprises the output words;

for each of one or more next output words of the sequence of output words:

determine a context of a sequence of the input words, wherein the context comprises a previously mapped contextual probability distribution of a fixed window of previous ones of the output words; and determine the contextual probability of the next output word; and generate a condensed summary using a decoder by maximizing the contextual probability of each of the output words in the sequence of the output words.

20. The system of claim 19, the processors being further operable when executing the instructions to:

encode each of the input words as an indicator vector, wherein the indicator vector captures features of the input word and a sequence of the indicator vectors captures features of the sequence of the input words, wherein the context of the sequence of the input words is determined by encoding the sequence of the indicator vectors with the context.

* * * * *